(12) United States Patent
Sherlock et al.

(10) Patent No.: US 7,766,726 B2
(45) Date of Patent: Aug. 3, 2010

(54) IN-SITU COMPRESSOR BLADE TIP CROPPING ASSEMBLY AND METHOD

(75) Inventors: Graham David Sherlock, Greenville, SC (US); Lynn Charles Gagne, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 530 days.

(21) Appl. No.: 11/822,790

(22) Filed: Jul. 10, 2007

(65) Prior Publication Data
US 2008/0115648 A1    May 22, 2008

Related U.S. Application Data

(60) Provisional application No. 60/859,251, filed on Nov. 16, 2006.

(51) Int. Cl.
*B24B 23/08* (2006.01)
(52) U.S. Cl. .................. 451/121; 451/358; 451/439

(58) Field of Classification Search ................. 451/439, 451/438, 415, 429, 121, 159, 358; 29/889.7, 29/889.23, 889, 889.1, 402.19; 409/132, 409/138, 180
See application file for complete search history.

(56) References Cited

U.S. PATENT DOCUMENTS

| 4,741,128 A | * | 5/1988 | Reaves et al. | ............... 451/439 |
| 4,805,282 A | * | 2/1989 | Reaves et al. | ............... 29/889.1 |
| 5,233,744 A | * | 8/1993 | Noland | ...................... 29/566.1 |
| 5,475,485 A | * | 12/1995 | Diener | .................... 356/241.3 |
| 6,302,625 B1 | * | 10/2001 | Carey et al. | ................. 409/132 |

* cited by examiner

*Primary Examiner*—Robert Rose
(74) *Attorney, Agent, or Firm*—Nixon & Vanderhye PC (57) ABSTRACT

An assembly is provided for cropping the trailing edge tip of a stator zero blade in-situ. The cropping assembly includes a base plate that is secured to the end of the compressor stator blade to be cropped; a removable, rotational guide block; and a drill that is mounted to the guide block and rotatable relative to the base plate to crop the trailing edge tip of a stator blade.

11 Claims, 8 Drawing Sheets

IN-SITU COMPRESSOR BLADE TIP CROPPING ASSEMBLY AND METHOD

This application claims the benefit of U.S. Provisional Application Ser. No. 60/859,251, which was filed Nov. 16, 2006, the entire disclosure of which is incorporated herein by this reference.

BACKGROUND OF THE INVENTION

The inventors discovered that it was necessary to remove a triangular piece from the tip of a compressor stator blade to adjust its harmonic frequency. The turbine could not be stopped for long enough to enable partial dismantling of the case and so it was necessary to devise a tool to facilitate cropping of the tips in-situ. As proposed, the invention was directed to the LMS-100 turbine which is one of the smallest produced by applicant's company, General Electric and, therefore, access is severely restricted. The ability to conduct this crop in-situ would avoid the need to top-case the unit. By removing the trailing edge tip of the compressor stator blade in-situ, a minimum of two weeks time that would be needed to strip down the turbine is avoided.

BRIEF DESCRIPTION OF THE INVENTION

The invention provides an assembly to crop the trailing edge tip of a stator zero blade in-situ. The cropping assembly is comprised of a base plate that is secured to the end of the compressor stator blade to be cropped; a removable, rotational guide block; and a drill that is mounted to the guide block and rotatable relative to the base plate to crop the trailing edge tip of a stator blade.

Thus in an example embodiment, the invention may be embodied in a blade tip cropping assembly comprising: a base plate including a clamping mechanism to removably secure the base plate to the compressor stator blade to be cropped; a guide block assembly disposed on the base plate; and a drill mounted to the guide block so as to be rotatable relative to said base plate, said drill having a collet and drill bit disposed at an angle to a longitudinal axis of said drill so that rotation of said drill about the longitudinal axis thereof moves said drill bit through a cutting arc.

The invention may also be embodied in a method of cropping a blade trailing edge tip comprising: providing a blade cropping assembly including a base plate, a guide block disposed on the base plate, and a drill mounted to the guide block so as to be rotatable about a longitudinal axis thereof with respect to said base plate; securing said base plate to the compressor blade; securing the drill to the guide block disposed on the base plate; actuating the drill; moving the drill with respect to the base plate and the blade so as to be sever the trailing edge tip of the blade with the drill bit of the drill.

DETAILED DESCRIPTION OF THE INVENTION

The prevent invention provides a tool or, more specifically, an assembly to remove a triangular piece from the tip of a compressor stator blade, e.g., in order to adjust its harmonic frequency. In an example embodiment the cropping assembly is used to crop the trailing edge tip of a stator zero blade in-situ so that a ½×½ triangle is removed. The assembly 10 is comprised of a base plate 12 that is secured to the blade 14 to be cropped, a 90° drill 16 and a removable, rotational guide block 18 comprised of a grinder holder assembly 20 and grinder nest 22 that supports and guides the drill to enable the removal of the trailing edge tip of the compressor stator blade 14 while fitted in the turbine. Thus, the 90° drill 16 rotates about an axis defined by the nest 22 and the base plate 12 locates the guide block 18 and drill 16 relative to the airfoil leading edge, suction side and turbine rotor.

Figure 1:
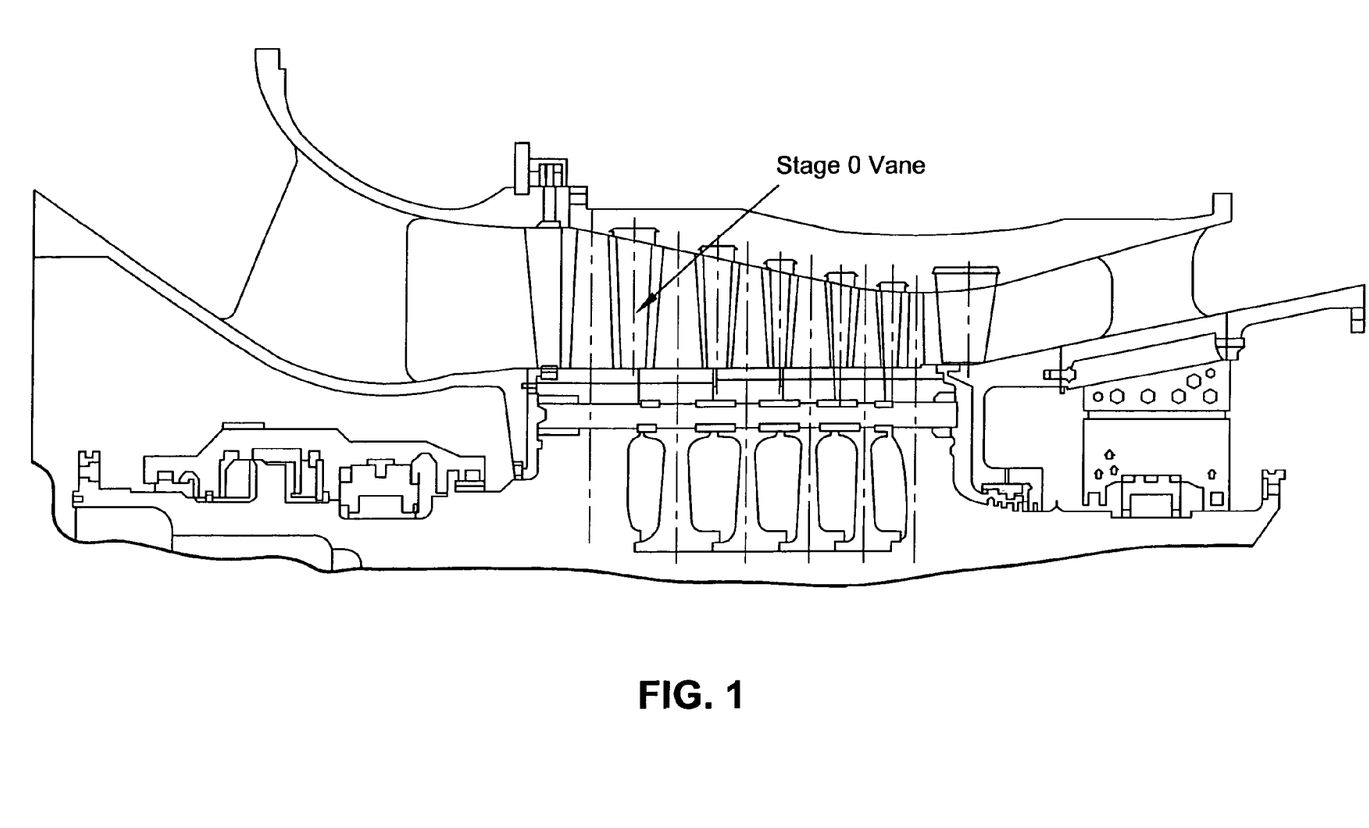
FIG. 1 is a schematic illustration of a compressor locating the stage zero vane.
Figure 2:
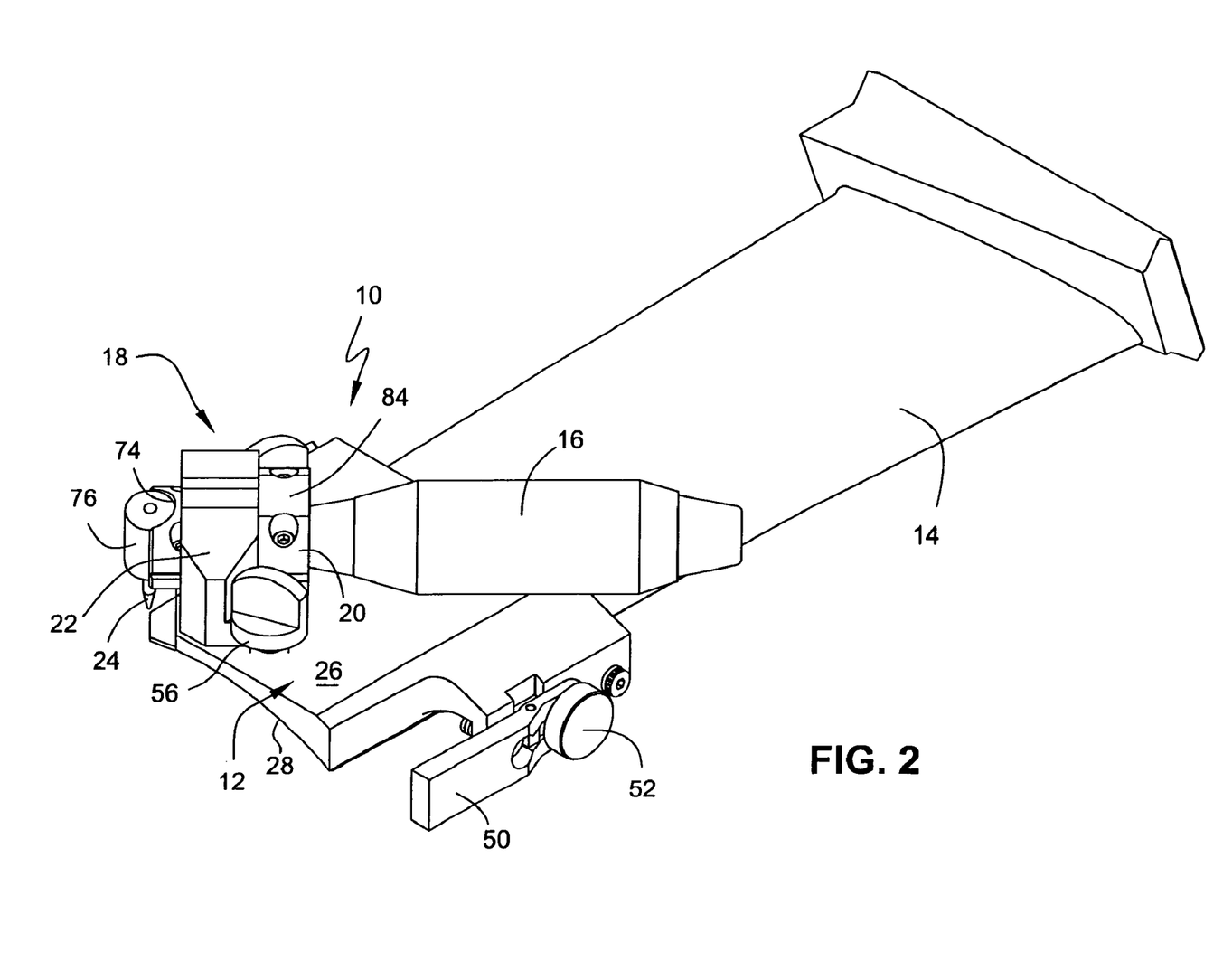
FIG. 2 is a perspective view of the cropping assembly embodying the invention secured to the stator blade.
Figure 10:
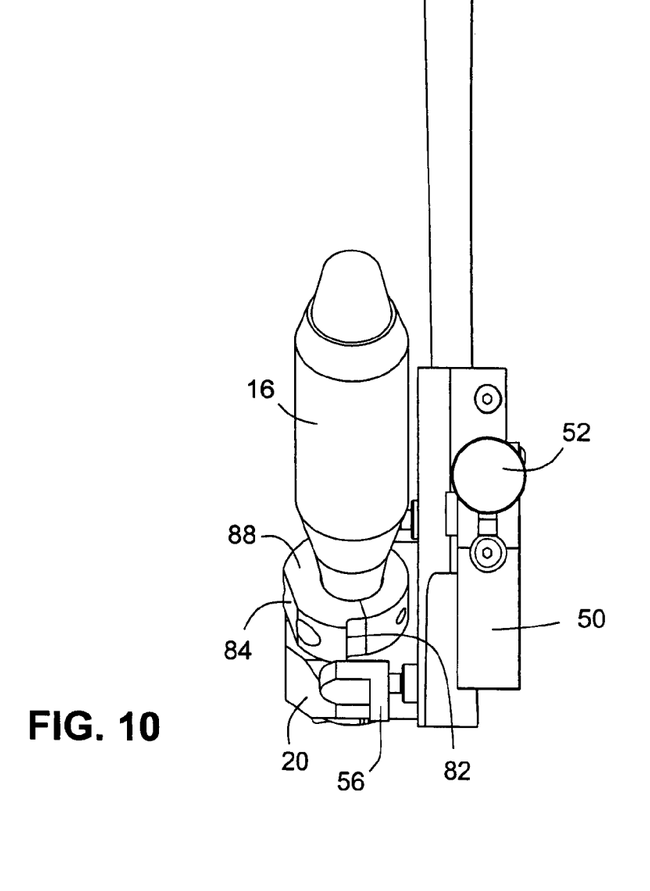
FIG. 10 is a right side elevational view of the assembly of FIG. 8.

FIG. 2 is a perspective view of the tip cropping assembly 10 secured to the compressor blade 14. As illustrated, the base plate 12 is secured to the blade substantially at its tip end with the 90° drill 16 rotatably mounted by means of the guide block 18. FIG. 10 illustrates the drill bit 24 extending perpendicularly so that the rotation of the drill 16 engages the drill bit 24 with the trailing edge tip of the compressor stator blade 14, to sever the same for removal.

Figure 9:
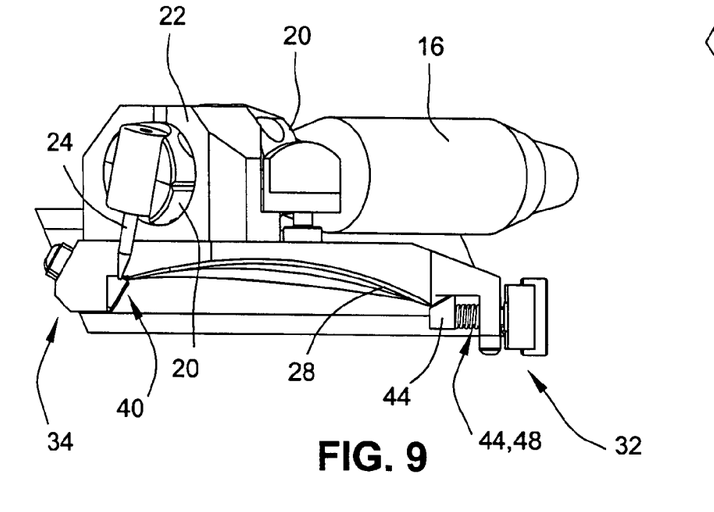
FIG. 9 is a tip end view of the assembly of FIG. 8.
Figure 11:
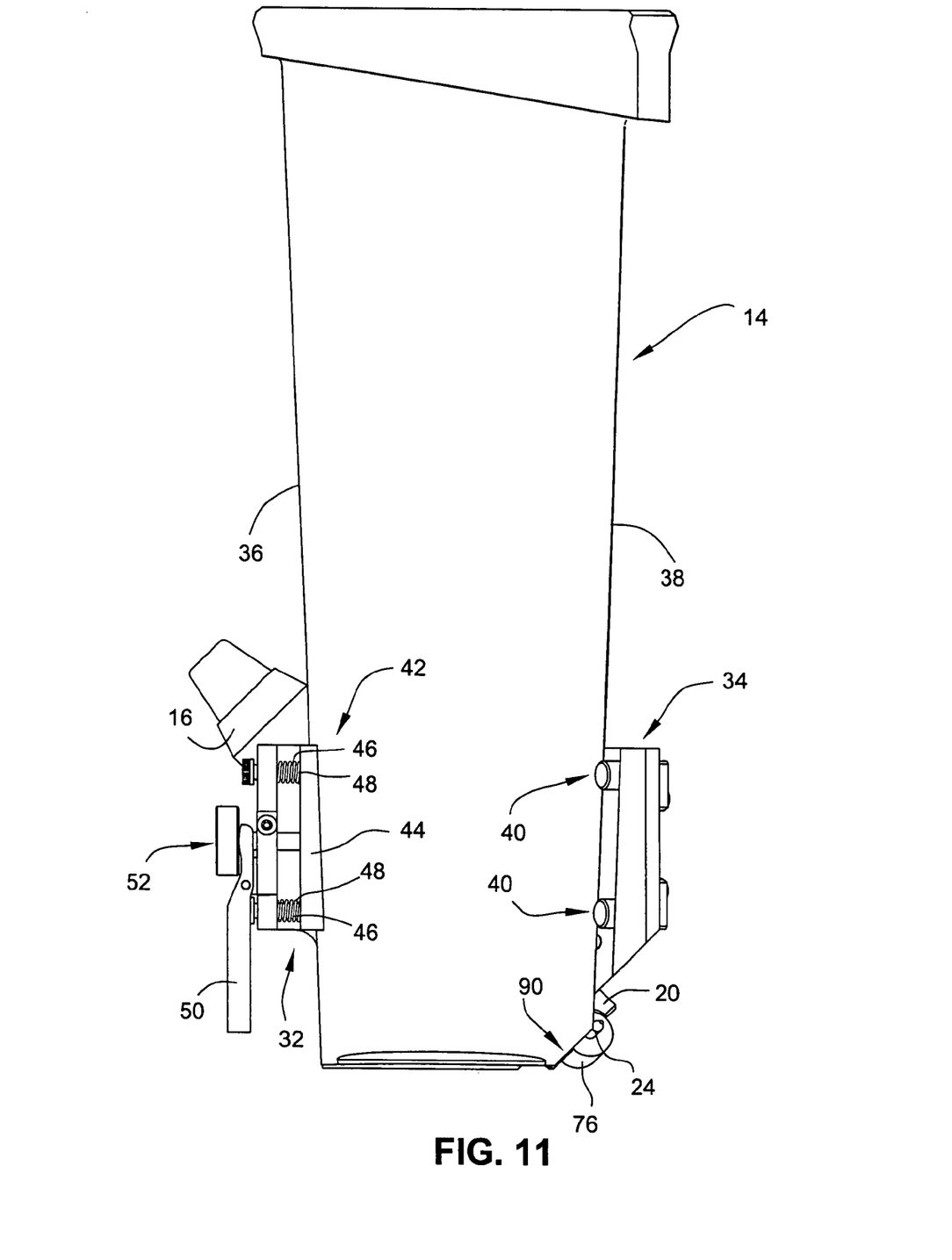
FIG. 11 is a bottom plan view of the blade with cutter equipment attached.

Referring more specifically to FIGS. 10 and 11, the base plate 12 has a generally flat upper surface 26 and a curved lower surface 28 complimentary to the suction side 30 of the stator blade 14. The base plate 12 further includes first and second depending legs 32,34 for engaging the leading and trailing edges 36,38 of the stator blade 14. As illustrated in FIGS. 9 and 11, pins 40 or other similar such protuberances project from the trailing leg 34 of the base plate 12 and the base plate 12 is secured onto the blade 14 by engaging the trailing edge 38 of the blade between the pins 40 and the bottom surface 28 of the base plate 12. A spring loaded lock 42 is provided on the leading leg 32 of the base plate, including a wedge block 44 that is resiliently mounted by pins 46 and springs 48 so that the wedge block 44 is retractable and extendable to receive the leading edge 36 of the blade 14. A squeeze lever 50 is provided to allow the base plate 12 to be locked onto the blade 14. A shoulder nut 52 is further provided to prevent unintended disengagement of the spring loaded lock 42. Once the base plate 12 has been hooked over the blade 14, the base plate is pushed hard against the rotor to properly locate the tool with respect to the trailing edge tip to be severed.

Figure 3:
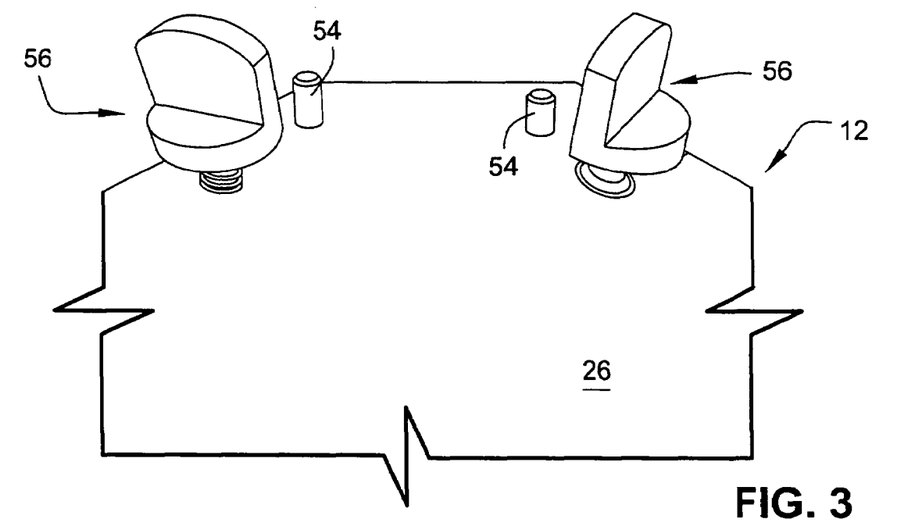
FIG. 3 is a perspective view of the cropping assembly base plate before receiving the cutter guide block.
Figure 4:
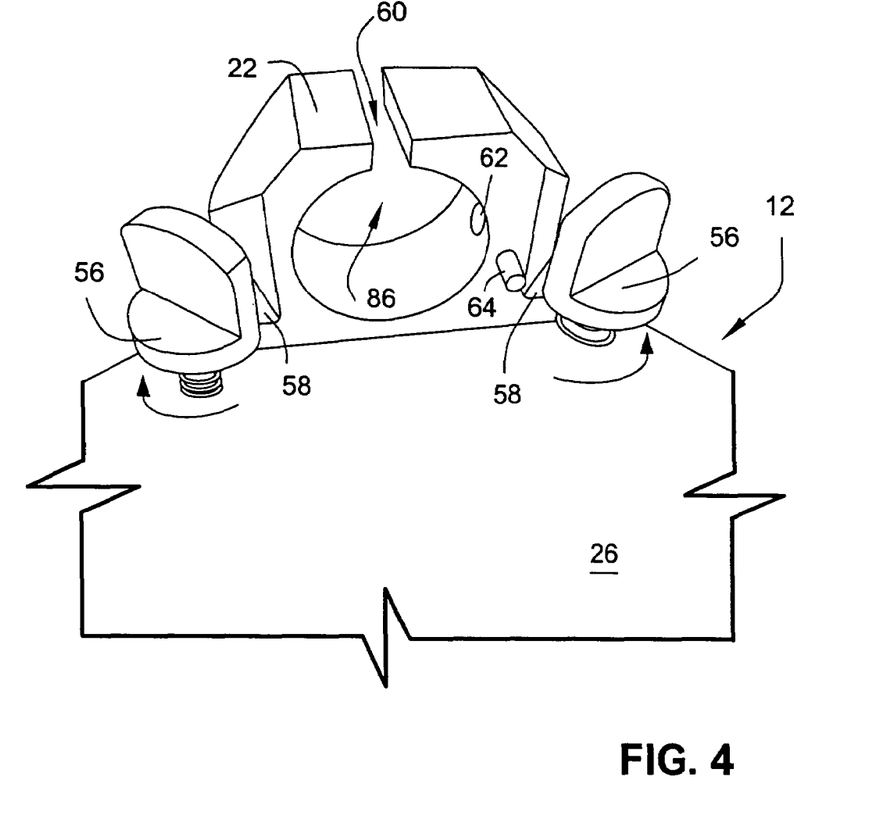
FIG. 4 is a view similar to FIG. 4 showing the cutter guide block in place.

The grinder nest 22 of the guide block 18 may be secured to the upper surface 26 of the base plate after the base plate 12 is located onto the blade. In this regard, FIG. 3 illustrates the upper surface 26 of the base plate in an example embodiment of the invention. In this embodiment, pins 54 project from the upper surface 26 of the base plate 12 for proper location of the grinder nest 22. Moreover, quarter turn screws 56 are provided to enable easy locking of the grinder nest 22 to the base plate 12 in-situ. FIG. 4 illustrates the grinder nest itself (described in greater detail below) mounted to the base plate and illustrates rotation of the quarter turn screws 56 for engaging respective lips 58 of the grinder nest to secure the same to the base plate. As illustrated, the grinder nest has an open slot 60 to allow the grinding tool or drill 16 to be inserted with the angled drill bit 24 attached thereto. Also seen in FIG. 4 is a ball catch 62 for guiding insertion and rotation of the drill assembly 16,20 as described in greater detail below, and a stop 64 provided for limiting rotation of the drill 16 relative to the base plate 12, to protect the rotor.

The cutter or drill bit 24 of the drill 16 is fit in a conventional manner and appropriate adjustments are made to ensure correct cutter length e.g., using a depth gauge. In an example embodiment of the invention, the drill 16 is a known dentist's #39 drill, although other drill assemblies could be used for edge tip removal.

The grinder holder assembly 20 illustrated in FIGS. 5-8 is secured to the distal end of the drill 16 for interfacing with, and guiding the drill with respect to, the grinder nest 22. In the illustrated example embodiment, the grinder holder assembly 22 is provided as two halves 66,68 that are secured circumferentially of the drill with suitable screws 70. As illustrated, the interior passage 72 defined by the joined halves of the grinder holder assembly is complimentary to the distal end of the drill 16 including, in the illustrated example, semi-circular cutouts 74 for accommodating the collet 76. The semi-circular cut-outs 74 ensure proper circumferential positioning of the grinder holder assembly 80 with respect to the drill 16 for assembly to the grinder nest 22 and rotation relative thereto, as described in greater detail below. In this regard, as illustrated in particular in FIGS. 5 and 6, the grinder holder assembly includes a circumferential groove 78 and on axial groove for being aligned with and to engage ball catch 62.

Figure 5:
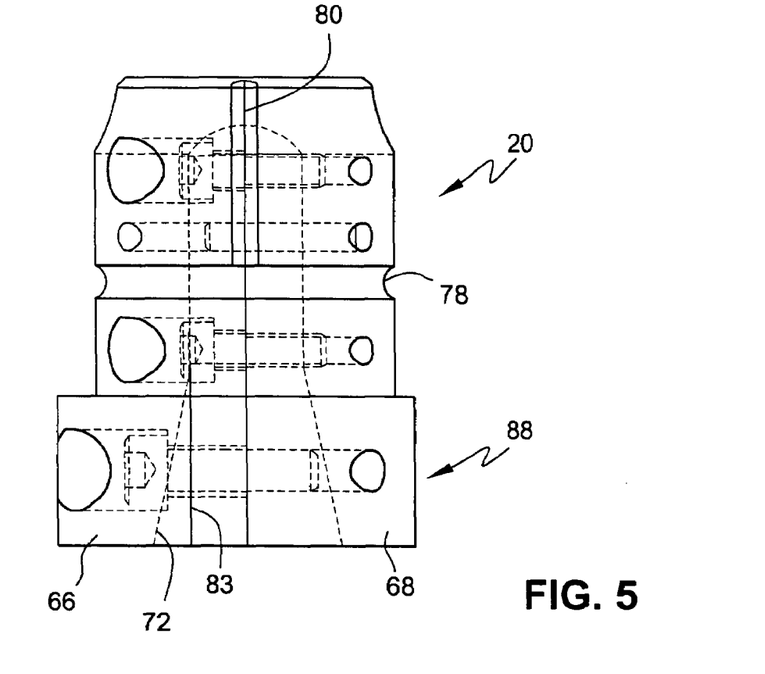
FIG. 5 is a side elevation of the grinder holder assembly according to an example embodiment of the invention.
Figure 6:
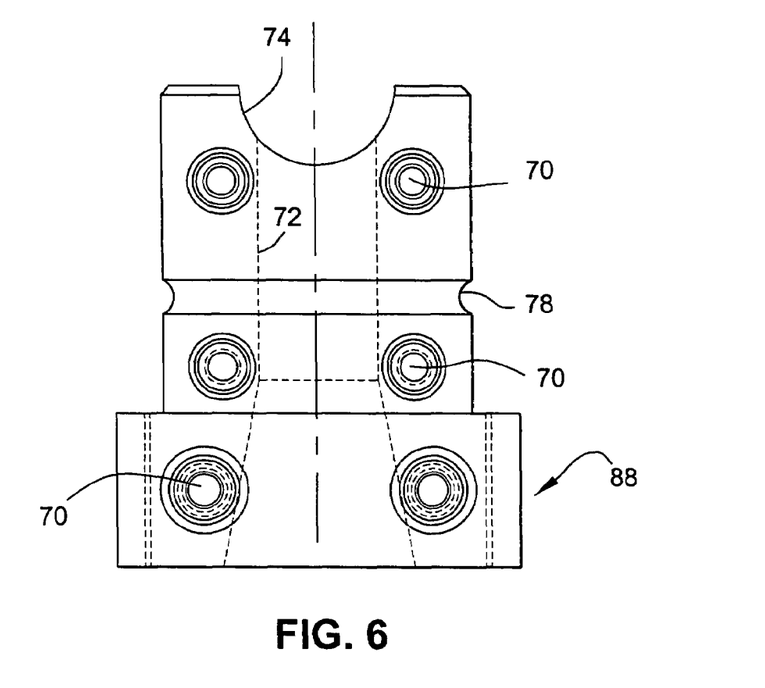
FIG. 6 is an another elevational view of the grinder holder assembly taken from the right of FIG. 6.
Figure 7:
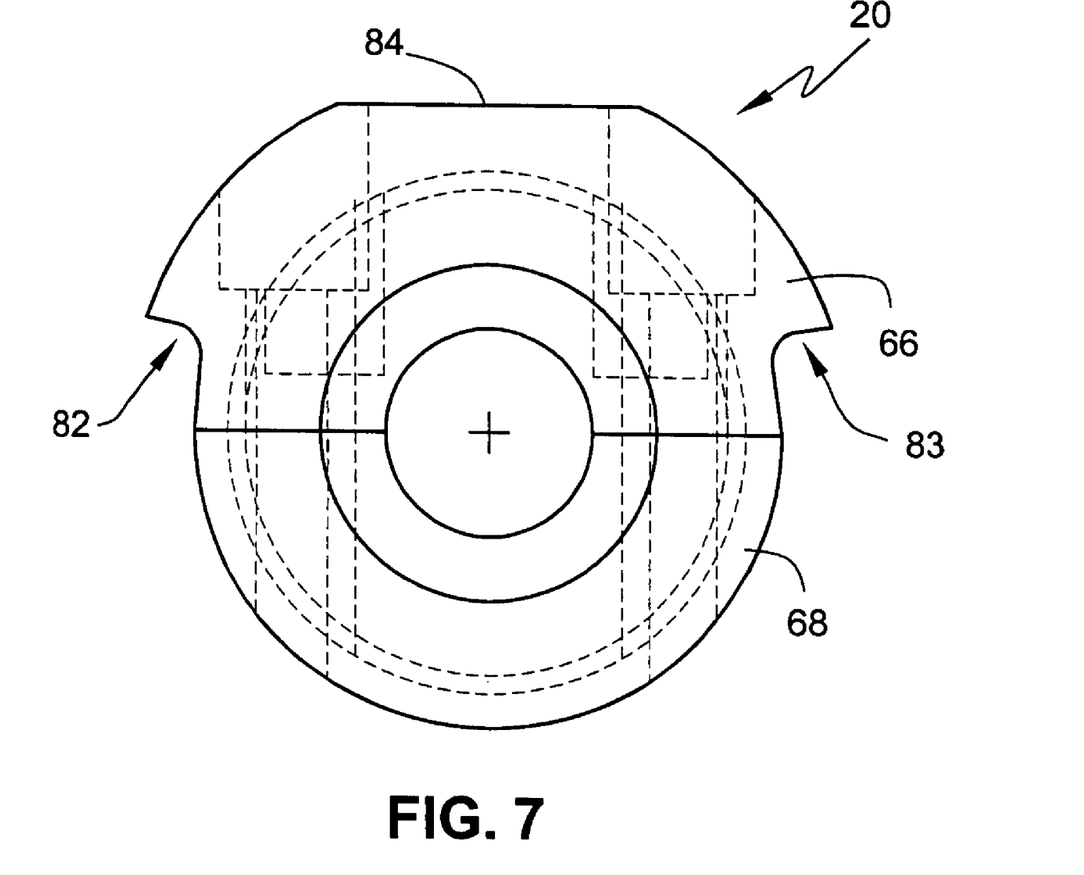
FIG. 7 is an end view of the grinder holder assembly.
Figure 8:
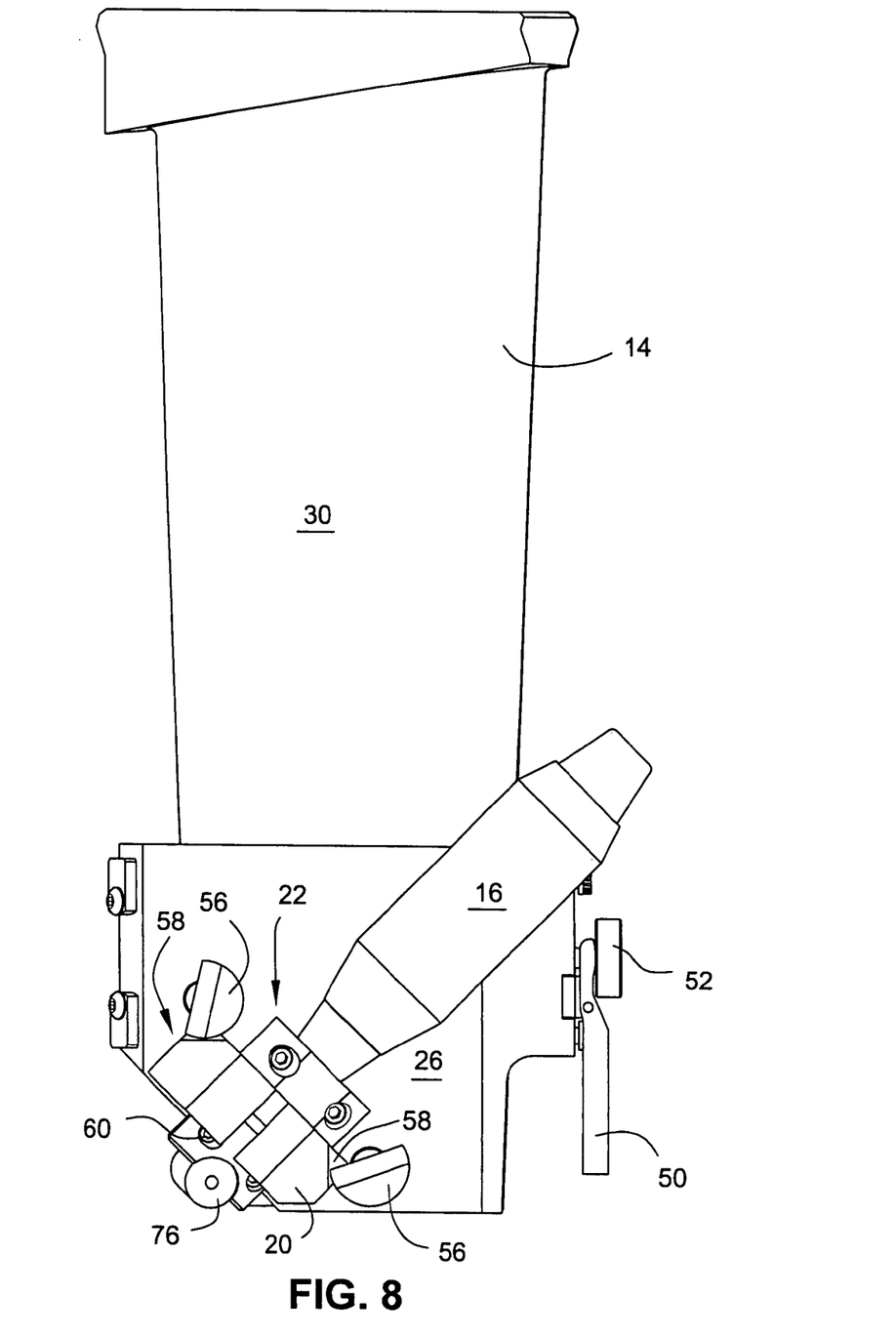
FIG. 8 is a top plan view of the cutter assembly mounted to the stator blade.

FIGS. 5-7 further illustrate the provision of shoulders 82,83 on the grinder holder for selectively engaging the stop 64 of the grinder nest 22, as described in greater detail below. Furthermore, the illustrated grinder holder assembly 20 includes a flattened side surface 84 to allow rotation relative to the base plate while minimizing the height of the guide block assembly 18 comprised of the grinder nest and grinder holder assembly.

Referring again to FIG. 4, the protruding ball catch 62 of the grinder nest 22 is adapted to be received in the axial groove 80 of the grinder holder assembly 20. Thus, the drill 16 is rotated so that the drill bit 24 extends upwardly and the drill with grinder holder mounted thereto is inserted into the bore 86 of the grinder nest 22 so that the drill bit 24 is accommodated by the slot 60 and the ball catch 62 of the grinder nest is received in the axial groove 80 of the grinder holder assembly 20. Once the drill 16 is inserted to the proper depth, the guide collar 88 of the grinder holder is disposed adjacent the grinder nest 22 and the ball catch 62 is aligned with the circumferential groove 78 to thereby allow rotation of the drill 16 with respect to the grinder nest and more importantly with respect to the blade to be cropped. Although in the illustrated embodiment, a ball catch is provided in the grinder nest and a corresponding axial and circumferential groove are provided on the grinder holder assembly it is to be understood that other complimentary components to control position and rotation of these two components could be provided. For example, one or more projections could be provided on the grinder holder assembly and a groove provided in the nest or some other complimentary guide for aligning the components for insertion and rotation.

It is also to be appreciated that attachment of the base plate to the blade may be accomplished with other locking mechanisms including clamps, set screws and spring loaded mechanisms having configuration(s) other than that of the illustrated embodiment without departing from applicant's invention.

During insertion of the grinder holder 20 as mentioned above, the flat edge 84 of the grinder holder is disposed in parallel to the flat upper surface 26 of the base plate. The drill bit may then be rotated clockwise in the FIG. 5 view. Rotation in a counter clockwise direction is precluded by engagement of shoulder 82 with stop pin 64. Rotation in a clockwise direction is permitted until shoulder 83 engages pin 64.

The assembled equipment as described hereinabove is illustrated in detail in FIGS. 8-11, wherein the trailing edge tip of the stator blade is shown cropped at 90.

Once the grinder holder assembly 20 is fully inserted in the grinder nest 22, it is rotated slightly to effectively lock the equipment for rotation only, e.g., through engagement of ball catch 62 and groove 78. The drill 16 is then actuated as appropriate for cutting the trailing edge tip of the compressor stator blade 14. The rotation speed should be adjusted appropriately so that it is not so fast that it will wear away the cutter rapidly. Once the drill bit, e.g., dentist's drill tip, is actuated, the cutter is rotated and the edge tip is severed until the guide collar shoulder 83 engages the stop pin 64. The cut is then complete. The drill tip is deactivated and the drill may then be removed from the grinder nest by rotating counter-clockwise until the drill bit 24 is in alignment with the slot 60, whereupon the drill may be retracted and removed and the base plate 12 disengaged from the blade by releasing shoulder screw 52, squeezing the lever 50 to retract the spring loaded wedge 64, and unhooking the base plate 12 from the blade 12.

As will be appreciated, the method of cropping a compressor blade trailing edge tip comprises securing a base plate 12 to the compressor blade, securing a drill 16 to a guide block 18 disposed, on the base plate, actuating the drill, and moving the drill with respect to the base plate and blade so as to sever the tip.

Preferably, the guide block 18 is comprised of a grinder holder 20 and a grinder nest 22, the grinder holder 20 being secured to the drill 16, the nest 22 being secured to the base plate 12, and the grinder holder and nest being engaged so that the drill can rotate with respect to the nest to sever the blade tip.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A blade tip cropping assembly comprising:
 a base plate including a clamping mechanism to removably secure the base plate to a compressor stator blade to be cropped;
 a guide block assembly disposed on the base plate; and
 a drill mounted to the guide block so as to be rotatable relative to said base plate, said drill having a collet and drill bit disposed at an angle to a longitudinal axis of said drill so that rotation of said drill about the longitudinal axis thereof moves said drill bit through a cutting arc.

2. An assembly as in claim 1, wherein said drill bit is disposed at a90 degree angle to said longitudinal axis of the drill so that the drill bit is swept through an arc perpendicular to the longitudinal axis of the drill.

3. An assembly as in claim 1, wherein said guide block comprises a grinder holder assembly secured to a distal end of the drill and a grinder nest disposed on an upper surface of said base plate, said grinder holder assembly being selectively received in said grinder nest so as to be rotatable relative to said grinder nest.

4. An assembly as in claim 1, wherein said grinder nest is substantially C shaped, having a slot parallel to a grinder holder assembly receiving axis thereof, to accommodate the drill bit of the drill.

5. An assembly as in claim 1, wherein said grinder nest includes one of a groove and a protrusion for engaging a complimentary protrusion or groove of the grinder holder assembly, said complimentary protrusion and groove determining a relative position of said grinder holder assembly and nest for insertion of the grinder holder assembly into the grinder nest and for allowing rotation of the grinder holder with respect to the grinder nest.

6. An assembly as in claim 5, wherein a groove is defined on the grinder holder assembly including an axial groove portion and a circumferential groove portion for receiving a complimentary protrusion of the grinder nest.

7. An assembly as in claim 1, wherein said base plate includes a main body and first and second depending legs, said main body being configured to be disposed on the suction surface of the compressor blade and said legs being configured to engage the leading and trailing edges of the blade.

8. An assembly as in claim 7, wherein one of said legs includes a spring loaded clamp mechanism for releasably engaging the blade.

9. A method of cropping a blade trailing edge tip comprising:
providing a blade cropping assembly including a base plate, a guide block disposed on the base plate, and a drill mounted to the guide block so as to be rotatable about a longitudinal axis thereof with respect to said base plate, said drill having a collet and a drill bit disposed at an angle to the longitudinal axis thereof so that rotation of said drill about said longitudinal axis moves said drill bit through a cutting arc;
securing said base plate to a blade;
securing the drill to the guide block disposed on the base plate;
actuating the drill; and
rotating the drill about the longitudinal axis thereof, with respect to the base plate and the blade, to move said drill bit through said cutting arc so as to sever the trailing edge tip of the blade with the drill bit of the drill.

10. A method as in claim 9, wherein
the guide block is comprised of a grinder holder and a grinder nest, the grinder holder being secured to the nest and the nest being secured to the base plate, the grinder holder being rotatable with respect to the nest so that the drill secured to the grinder holder can rotate with respect to the nest to sever the blade trailing edge tip; and
said securing the drill comprises securing the grinder holder to a distal end of the drill, inserting the drill and grinder holder into the nest and rotating the drill and grinder holder with respect to the nest so as to axially lock the grinder holder to the nest.

11. A method as in claim 10, wherein the grinder holder and nest are axially locked by engagement of a protrusion and a circumferential groove.

* * * * *